United States Patent
Vasseur et al.

(10) Patent No.: US 9,577,937 B2
(45) Date of Patent: Feb. 21, 2017

(54) ENSURING DYNAMIC TRAFFIC SHAPING FAIRNESS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US)

(73) Assignee: Cisco Technology, Inc., San Jose, CA (US)

(*) Notice: Subject to any disclaimer, the term of this patent is extended or adjusted under 35 U.S.C. 154(b) by 120 days.

(21) Appl. No.: 14/338,870

(22) Filed: Jul. 23, 2014

(65) Prior Publication Data

US 2016/0028632 A1 Jan. 28, 2016

(51) Int. Cl.

| H04L 12/803 | (2013.01) |
| H04L 12/815 | (2013.01) |
| H04L 12/911 | (2013.01) |
| H04L 12/825 | (2013.01) |
| H04L 12/28 | (2006.01) |
| H04L 12/24 | (2006.01) |
| H04L 12/26 | (2006.01) |
| H04L 12/853 | (2013.01) |

(52) U.S. Cl.
CPC ............ H04L 47/122 (2013.01); H04L 12/28 (2013.01); H04L 41/0816 (2013.01); H04L 43/08 (2013.01); H04L 47/22 (2013.01); H04L 47/2416 (2013.01); H04L 47/26 (2013.01); H04L 47/823 (2013.01)

(58) Field of Classification Search
None
See application file for complete search history.

(56) References Cited

U.S. PATENT DOCUMENTS

| 6,836,475 | B2 | 12/2004 | Chaskar et al. |
| 7,130,272 | B1 | 10/2006 | Gai et al. |
| 8,214,868 | B2 | 7/2012 | Hamilton et al. |
| 8,385,199 | B1* | 2/2013 | Coward ............... H04W 28/02 370/230.1 |
| 8,699,333 | B2 | 4/2014 | Vasseur et al. |
| 2012/0218887 | A1 | 8/2012 | Khilnani et al. |
| 2014/0064077 | A1 | 3/2014 | Chorafakis et al. |
| 2015/0295808 | A1* | 10/2015 | O'Malley .............. H04L 47/22 709/224 |

FOREIGN PATENT DOCUMENTS

| WO | WO-03/052981 A1 | 6/2003 |
| WO | WO-2005/048533 A1 | 5/2005 |

OTHER PUBLICATIONS

International Search Report dated Nov. 12, 2015 in connection with PCT/US2015/041118.
Sajassi et al., "BGP MPLS Based Ethernet VPN draft-ietf-l2vpn-evpn-07", Network Working Group, Internet Engineering Task Force Trust. May 7, 2014, pp. 1-50.

* cited by examiner

*Primary Examiner* — Diane Lo
(74) *Attorney, Agent, or Firm* — Parker Ibrahim & Berg LLC; James M. Behmke; Stephen D. LeBarron

(57) ABSTRACT

In one embodiment, a device in a network receives an indication of a traffic shaping rate adjustment by a node due to a network condition. The device identifies a set of network nodes that are associated with the network condition. The device detects a traffic shaping rules violation by an offending node in the set of network nodes. The device sends an instruction that causes the offending node to use a different traffic shaping rate.

25 Claims, 13 Drawing Sheets

ENSURING DYNAMIC TRAFFIC SHAPING FAIRNESS

TECHNICAL FIELD

The present disclosure relates generally to computer networks, and, more particularly, to ensuring fairness among network routers that use dynamic traffic shaping.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. However, such a reactive approach may also, by its very nature, mean that the network experiences periods of reduced performance before corrective measures are taken.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives an indication of a traffic shaping rate adjustment by a node due to a network condition. The device identifies a set of network nodes that are associated with the network condition. The device detects a traffic shaping rules violation by an offending node in the set of network nodes. The device sends an instruction that causes the offending node to use a different traffic shaping rate.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
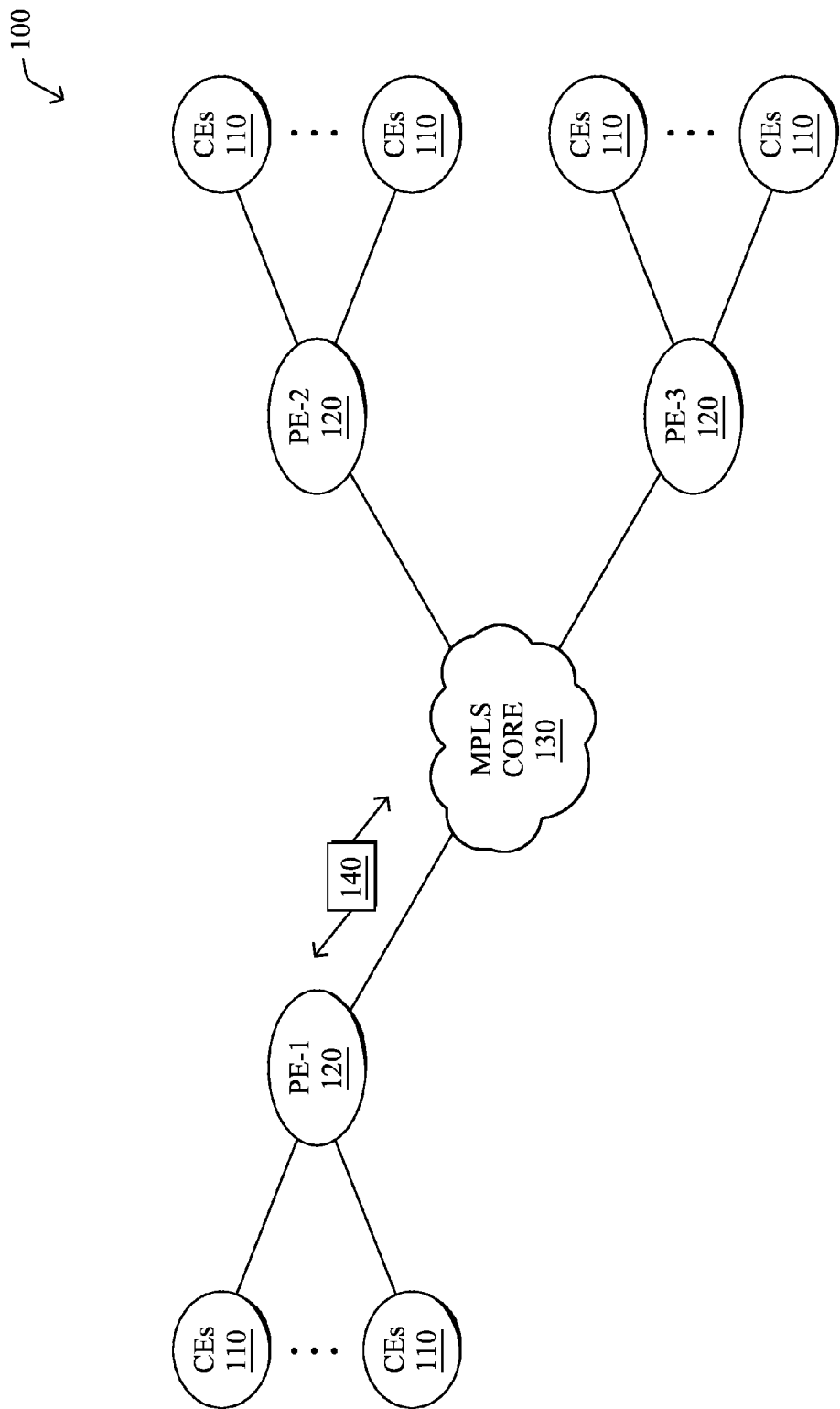
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

4.) Site Type C: a site of type B (e.g., types B1, B2 or B3) but with more than one CE router (e.g., a first CE router connected to one link while a second CE router is connected to the other link), and potentially a backup link (e.g., a wirleless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Figure 2:
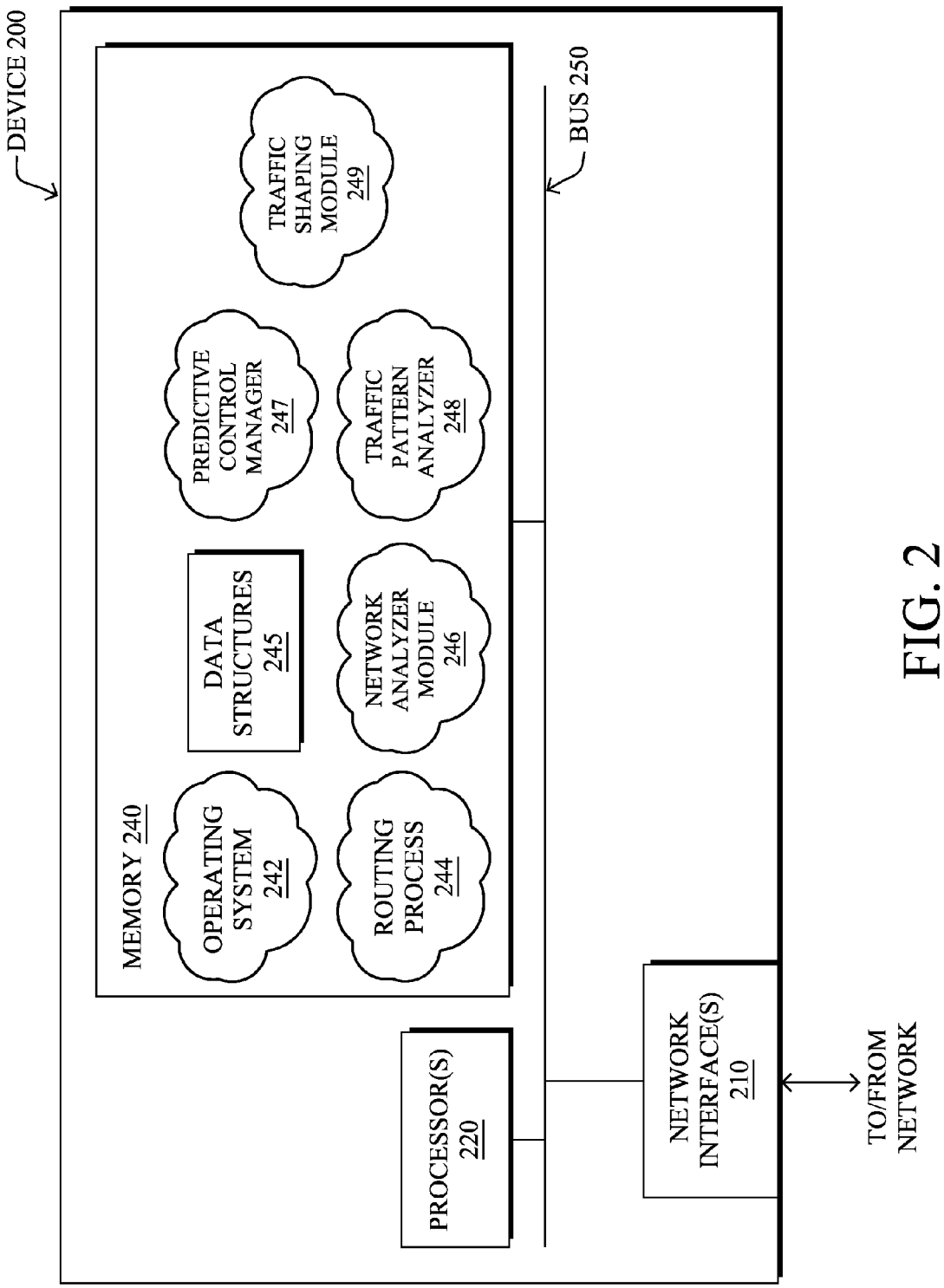
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CE routers 110, a network controller (e.g., a device associated with a network operations center (NOC)), or any other computing device that supports the operations of network 100 (e.g., switches, etc.). Device 200 comprises a plurality of network interfaces 210, one or more processors 220, and a memory 240 interconnected by a system bus 250 and powered by a power supply 260. The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a network analyzer module (NAM) 246, a predictive control manager (PCM) 247, a traffic pattern analyzer (TPA) 248, and/or a traffic shaping module 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performance in terms of connectivity and bandwidth.

According to various embodiments described herein, a dynamic, predictive performance architecture is disclosed that may be implemented in a network, such as a multi-service, multi-carrier WAN. In particular, NAM 246, PCM 247, TPA 248, and/or traffic shaping module 249 may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller / dAPIC of routing services 244) and correlate the application-specific SLAs with the predicted traffic profile and network performance, to perform closed-loop control that meets the application-specific SLAs. Traffic shaping module 249 may operate to determine network characteristics, such as those used by NAM 246. In various implementations, processors 244 and 246-249 may be co-located or may be distributed across different network devices. Further, while certain functions are described herein with respect to a particular one of processors 244, 246-249, the functions may be incorporated into any of the other processors, in various other embodiments.

Figure 3:
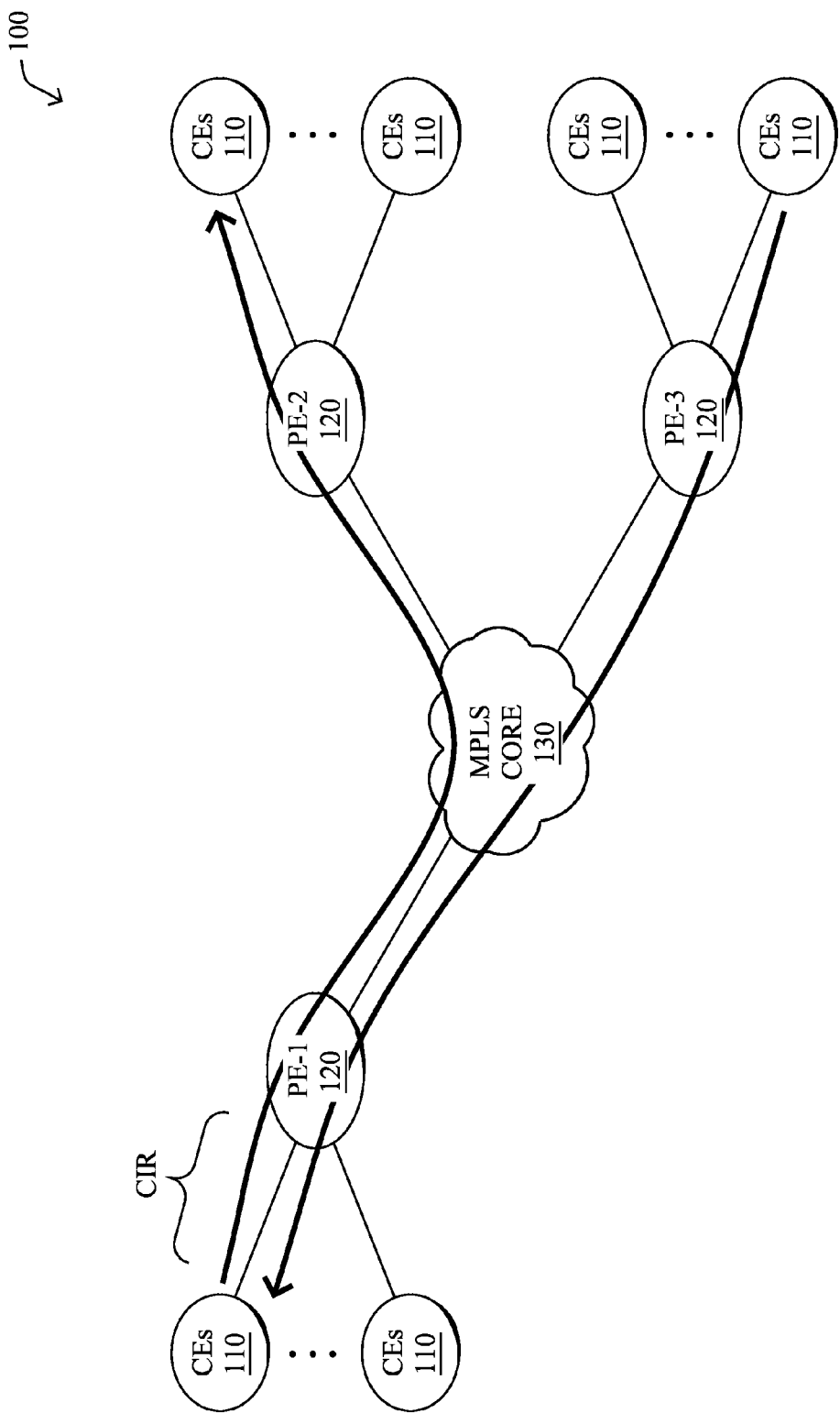
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

According to various embodiments, a predictive performance methodology for WANs and other forms of networks is introduced that that allows for its use across varying network architectures, application requirements, and deployment strategies, as well as in the presence of dynamic traffic and network performance. As detailed below, such an architecture may make use of machine learning techniques, in some embodiments, to evaluate future network requirements and performance, and to take corrective measures within the network to ensure the SLAs are met.

Figure 4A:
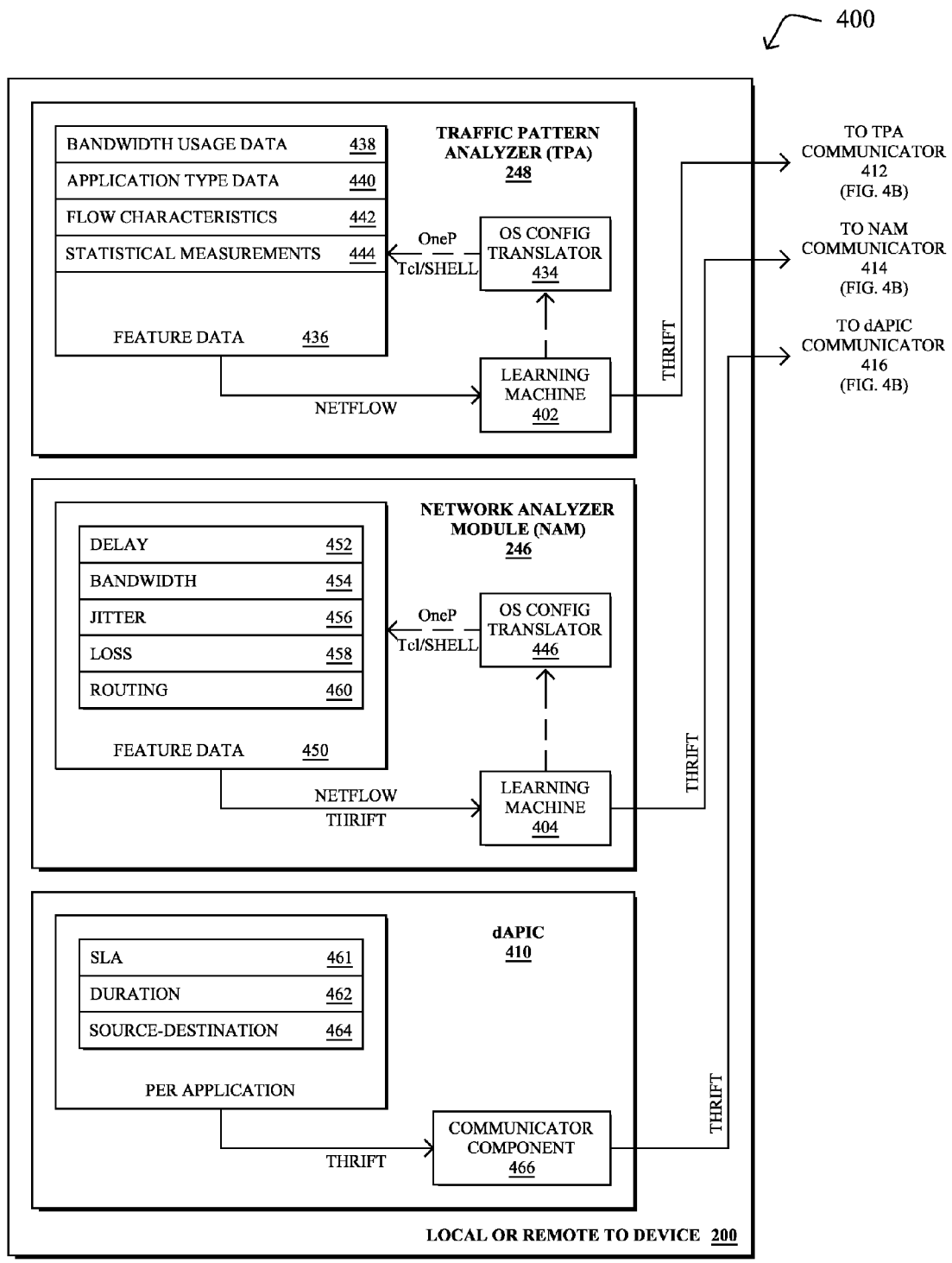
FIGS. 4A-4B illustrate an example architecture for predictive networking.
Figure 4B:
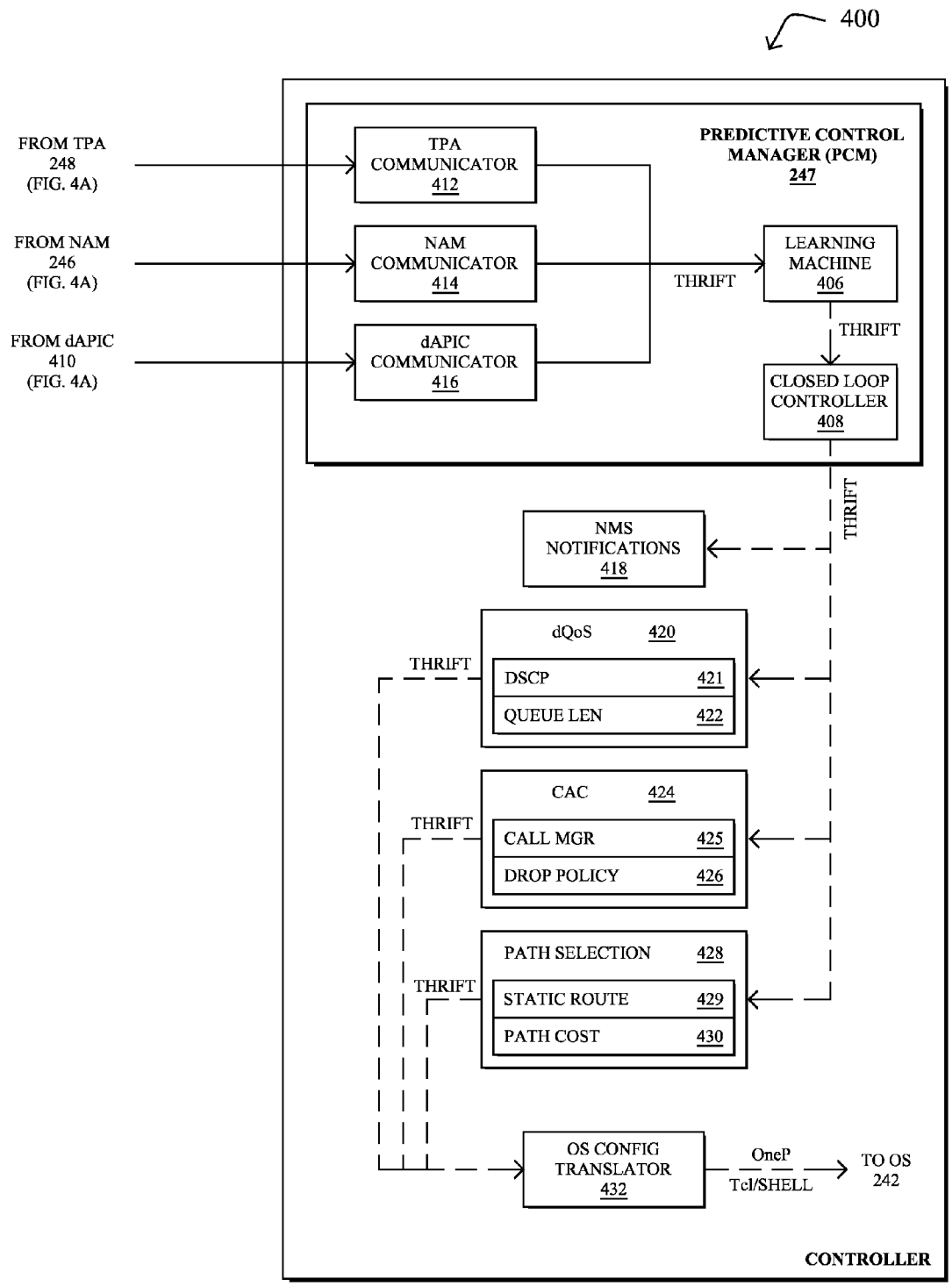

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processors for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, bandwidth data 454 along a given path may be available from any of the following source: (1) SLA processors may yield data about the delay, jitter and packet loss, which can, in some circumstance, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processors can be used to predict the performance evolution.

Feature data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no reason to perform any further direct measurement, which may be very expensive, but if the prediction of the time-series model and the regression diverges, this may trigger another direct measurement. In some embodiments, NAM 246 may determine whether a direct measurement of any of feature data 450 is needed based on a measure of confidence associated with a model used by learning machine 404.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 461 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 461-464), which may have information about all of the applications in the network, as well as their corresponding SLA requirements.

If an application SLA is predicted not to be met, PCM 247 may take any number of corrective measures to ensure that the SLAs continue to be met (e.g., by sending commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 461), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

Referring again to FIG. 3, traffic shaping may be performed by a CE router 110, to control the rate at which packets are communicated over a network connection with a PE router 120 (e.g., over an MPLS VPN link, over a public Internet connection, etc.). Traffic shaping may be employed using any number of different link access types (e.g., Frame Relay, ATM, Serial, etc.), in order to control the rate at which packets are communicated (e.g., over an interface, (GRE) tunnel, ATM VC, Frame Relay circuit, etc.).

In contrast with traffic policing whereby traffic exceeding a committed rate is simply discarded, traffic shaping allows traffic rates to be managed via queuing, to comply with a service agreement from a network provider. For example, a Service Provider could provide a T1 physical link with a video conferencing (VC) data rate of X Kbits/s, with X<<T1's bandwidth.

Generic Traffic Shaping (GTS) may rely on the use of one or more token buckets, which are characterized by a Committed Information Rate (CIR). In general, a CR is a network parameter related to the data rate at which traffic can be transmitted, a Burst Size (Bc), which indicates the number of bits or bytes that can be transmitted per unit of time to avoid queuing, and a Time Interval (TI), which is the time quantum per burst. In other words, communication tokens may be replenished with tokens at a given rate within a router (e.g., CE router 110), to allow for a burst of traffic before queuing takes place. Thus, the interface transmission rate will never exceed the mean rate during a given time interval, and a maximum burst size can still be sent during the interval. Notably, the instantaneous bit rate may be higher at any given time during a time interval. GTS may also be extended with an additional token bucket (leading to dual or multiple token buckets) characterized by an Excess Burst Size (Be). Be may be used to avoid tail drop and congestion, which is of the utmost importance with TCP-based traffic, for example.

Said differently, a CIR may be a configurable parameter on a router (e.g., a CE router 110) that represents the average traffic rate that may be communicated over a network connection (e.g., by a permanent virtual circuit, etc.) over a given time interval. The CR is often set much lower than the access rate, which is the speed associated with the physical connection. Typically, a CIR may be determined by a service provider based on statistical multiplexing. However, many networks may experience dramatic variations in the actual available data rates, making it difficult to determine the actual CIR.

In some implementations, traffic shaping may be performed via a statically configured output rate set on a CE router. The traffic shaping function (e.g., traffic shaping module 249) then operates to control bursts such that the output rate is smoothed across multiple time periods. Typically, the output rate is set to the CR, in an attempt to smooth bursts such that the CR is met. However, if the output rate is less than the true CR, this may lead to unnecessary queuing and, consequently, delays. Conversely, if the output rate exceeds the true CR, this may lead to packet drops in the network, with consequences on both TCP-based traffic (e.g., over-reacting to loss) and UDP-based traffic (e.g., application based retransmission).

Traffic shaping module 249 may be adapted to operate in conjunction with the predictive networking architecture 400 shown in FIGS. 4A-4B. In particular, learning machine 404 in NAM 246 may predict available network resources, such as available bandwidth for a given network connection. In turn, traffic shaping module 249 may use these predictions to continually adjust its traffic shaping rate (e.g., its traffic output rate). As noted previously, NAM 246 and traffic shaping module 249 may or may not be co-located. For example, traffic shaping module 249 may be located on a CE router while NAM 246 is located on another network device, such as a PE router or network controller. In some embodiments, IPv4 or IPv6 unicast messages may be sent between CE router hosting traffic shaping module 249 and the device hosting NAM 246, to facilitate the functions described herein.

For purposes of illustration, let CIR Static (CIR-S) refer to the static CIR set on a given router. CIR-S may be configured locally or, alternatively, be uploaded to the router via an automatic configuration mechanism. In addition, let CIR Predicted (CIR-P) refer to a predicted CIR determined by NAM 246. In contrast to implementations in which CIR-S is used to make traffic shaping decisions, the techniques herein may allow the theoretical CIR-S to be compared against fluctuations in CIR-P, for purposes of performance analysis.

Figure 5A:
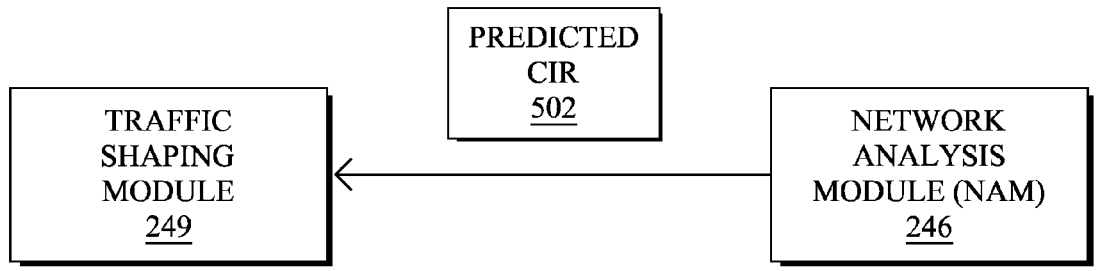
FIGS. 5A-5C illustrate an example architecture to perform traffic shaping based on predicted network resources.

In some embodiments, NAM 246 may send predictions to traffic shaping module 249 in an unsolicited manner. For example, as shown in FIG. 5A, NAM 246 may send a predicted CIR (CIR-P) 502 to traffic shaping module 249 in response to a change in the value of CIR-P 502. In one embodiment, NAM 246 may send an updated CIR-P 502 to traffic shaping module 249 each time the absolute value of CIR-P 502 changes. In another embodiment, other triggering conditions may be used (e.g., if the percentage of change between current and newly computed values exceeds some threshold, when the absolute change in value is greater than a given value, etc.).

CIR-P 502 may be determined by NAM 246 in any number of different ways, depending on the learning machine techniques used by NAM 246. For example, assume that NAM 246 computes a time-based predictive model for the network resource for a given period of time (e.g., the available bandwidth for the next n-number of hours). If the predicted available bandwidth for the time period has increased over the previous time period, NAM 246 may predict a corresponding increase in CIR-P. Similarly, if the predicted available bandwidth is lower for the time period in comparison to the previous time period, NAM 246 may predict a corresponding decrease in CIR-P. In other words, CIR-P 502 may be associated with a particular time period. After expiration of the time period, NAM 246 may compute a new CIR-P value and provide the value to traffic shaping module 249.

Figure 5B:
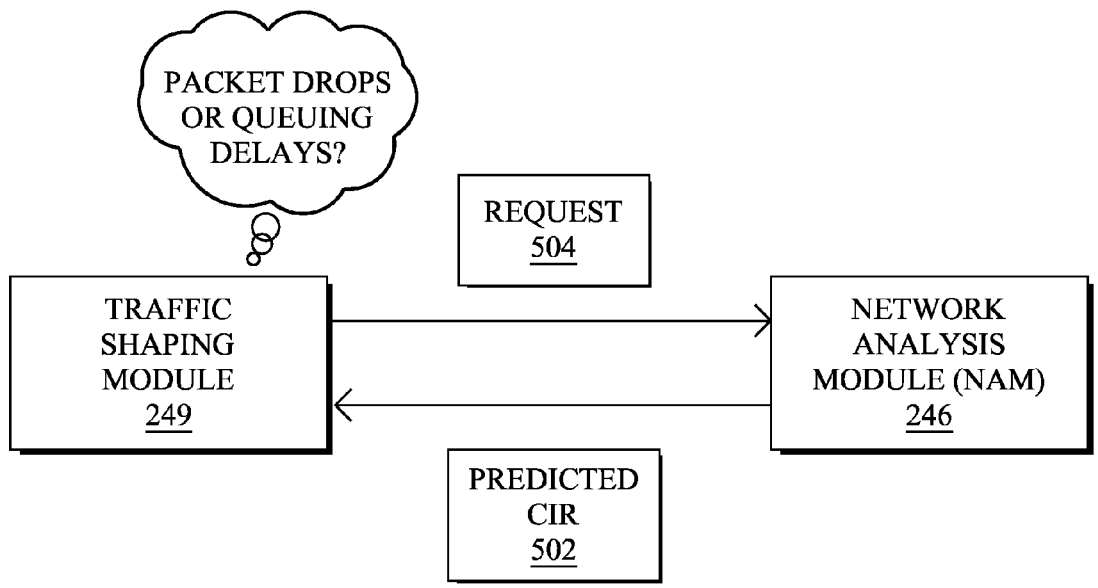

In other embodiments, traffic shaping module 249 may explicitly request a CIR-P value from NAM 246. For example, as shown in FIG. 5B, traffic shaping module 249 may send a prediction request 504 (e.g., a unicast IP message) to NAM 246. In response, NAM 246 may provide the most current CIR-P value to traffic shaping module 249 in CIR-P 502.

In a first case, traffic shaping module 249 may send prediction request 504 to NAM 246 in response to detecting the presence of local queuing delays. In particular, the traffic shaping module 249 may be operable to determine whether excessive delays are present due to the use of local queuing. In one embodiment, the router may send probes out that are also subject to the same queuing policies as the current traffic, to determine whether queuing delays are present or excessive (e.g., above a threshold amount). If such delays are present or execssive, traffic shaping module 249 may send prediction request 504 to NAM 246 in the hope that the predicted bandwidth has increased since the last update to CR-P.

In another embodiment, traffic shaping module 249 may probe for queuing delays in accordance with traffic predictions from TPA 248. Such predictions may be used, for example, to avoid impacting user traffic during the probing process. The additional probing traffic may be destined to a remote CE and should explicitly be acknowledged. For example, in the following topology CE1—PE1—Core PE2—CE2, the traffic shaping module 249 hosted on CE1 may send additional traffic to CE2 that, in turn, acknowledges the additional traffic.

In a second case, traffic shaping module 249 may be operable to determine the rate at which packets are dropped (e.g., such as with TCP-based traffic). When these metrics are available and the amount or rate of dropped packets exceeds a threshold value, traffic shaping module 249 may send prediction request 504 to NAM 246 for an updated prediction. In some embodiments, traffic shaping module 249 may also temporarily override the prediction, in order to reduce to request the shaper to reduce the rate of shaping, waiting for further updates from NAM 246. In another embodiment, traffic shaping module 249 may continue to monitor the packet drop rates to ensure that reducing the traffic had an impact on the packet drops. In other words, reducing the traffic rate may not have an effect if packets are dropped for other reasons such as lossy links (e.g., in the case of IoT networks), as opposed to the router simply having too high of an output rate.

Figure 5C:
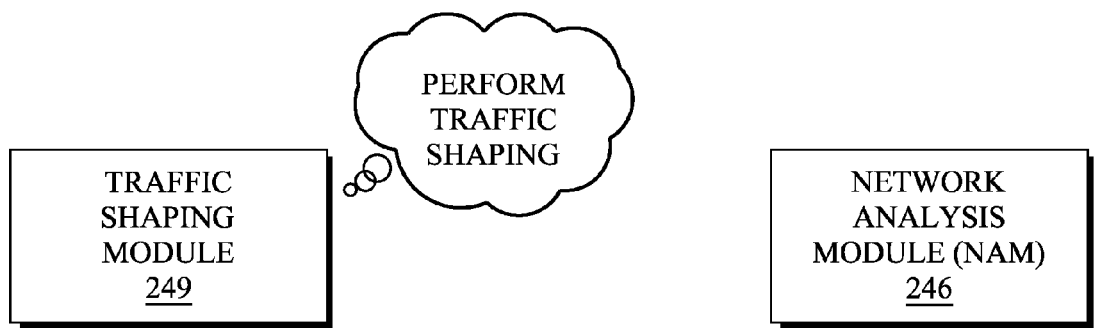

As shown in FIG. 5C, traffic shaping module 249 may use CIR-P 502 from NAM 246 to make traffic shaping decisions. For example, traffic shaping module 249 may increase or decrease its traffic shaping output rate based on a corresponding increase or decrease in value of CIR-P 502. Notably, in the case in which queuing delays are present, an increase in CIR-P (if predicted) may result in a reduction in queuing delays. Said differently, the amount of queuing may be reduced if the network is predicted to support a higher traffic rate. Conversely, in the case in which packet drops are detected, a decrease in CIR-P (if predicted) may result in fewer packet drops, assuming the dropped packets are attributable to the output traffic rate being too high. In some cases, traffic shaping module 249 may also adjust its traffic shaping strategy in response to detecting queuing delays or dropped packets, while awaiting an updated CIR-P.

As noted above, predictions regarding a network may be used to adjust dynamically the traffic shaping performed by any number of CE routers (e.g., field area routers in a large enterprise of the IoT, etc.). Such an approach contrasts with other traffic shaping mechanisms in which the shaping rate is statically configured, which may lead to high inefficiencies in the network. However, as the network increases in size, the variety of router configurations may also increase (e.g., the number of different operating systems used, the hardware devices used, the vendors involved, etc.). Thus, some situations are envisions in which a set of routers aggressively sending traffic along a given path may saturate the paths, leading to backpressure being triggered by other routers using dynamic shaping. In other words, certain routers employing dynamic traffic shaping may decrease their shaping rate due to congestion, while other routers may continue to flood the core of the network. This may be inherently unfair, as the well-behaving routers that work to alleviate the contention would be penalized in comparison to the bad-behaving routers that continue to flood the network with traffic.

Ensuring Dynamic Traffic Shaping Fairness

The techniques herein allow the use of dynamic traffic shaping (e.g., either reactive or proactive shaping, as detailed above), while ensuring that the traffic flow rate adjustments are performed in a manner that is fair to all of the routers involved. In some aspects, new messages are disclosed that capture information regarding rate change events (e.g., shaping rate reductions, shaping rate increases, etc.) and are sent to a dynamic shaping fairness agent (DSFA). In response, the DSFA may correlate events to identify the network resource(s) (e.g., network links, etc.) associated with the rate adjustment (e.g., by identify a link experiencing contention, which led to a router decreasing its traffic rate). In further aspects, the DSFA may identify any misbehaving routers that also make use of the resource(s). For example, the DSFA may request traffic sampling to be redirected, to identify those routers that did not adjust their shaping rates, that do not support dynamic rate adjustments, or that otherwise are unfairly making use of the resource(s). In some cases, the DSFA may compute a new traffic rate for a misbehaving router (e.g., based on the amount of traffic, criticality of the supported flows, etc.) and initiate manual adjustment of the rate by a human operator.

Specifically, according to one or more embodiments of the disclosure as described in detail below, a device in a network receives an indication of a traffic shaping rate adjustment by a node due to a network condition. The device identifies a set of network nodes that are associated with the network condition. The device detects a traffic shaping rules violation by an offending node in the set of network nodes. The device sends an instruction that causes the offending node to use a different traffic shaping rate.

Illustratively, the techniques described herein may be performed by hardware, software, and/or firmware, such as in accordance with processors 244, 246-249, which may contain computer executable instructions executed by the processor 220 (or independent processor of interfaces 210) to perform functions relating to the techniques described herein. For example, the techniques herein may be treated as extensions to conventional protocols, such as the various networking protocols or wireless communication protocols, and as such, may be processed by similar components understood in the art that execute those protocols, accordingly.

Operationally, dynamically triggered traffic shaping adjustments made by routers in the network may be reported to a DSFA. In general, there may be two types of shaper adjustments that may be reported. In a first case, the traffic rate may be dynamically increased, such as when the machine learning processors described above predict that additional network resources will become available in the future. In a second case the traffic rate may be dynamically decreased, such as when a router detects packet drops in the core network, thus reflecting link/node congestion along the communication path.

Figure 6:
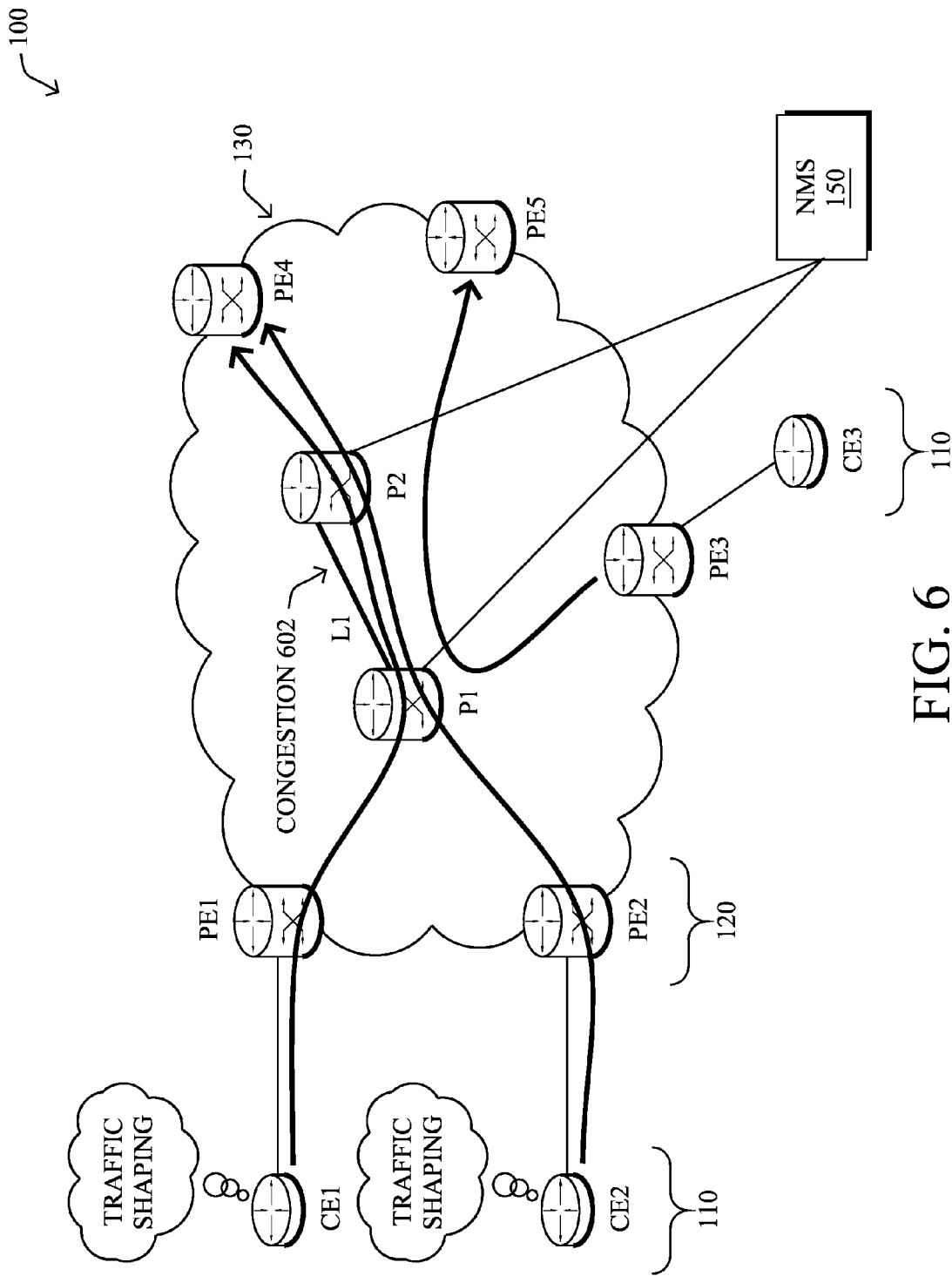
FIG. 6 illustrates an example of network congestion being detected.

As shown in FIG. 6, a DSFA may be hosted by a centralized networking device such as NMS 150, a dedicated server, a device in the service provider network (e.g., such as when the network is managed by the service provided), or in the public or private cloud. Also as shown, assume that CE routers 110 (e.g., CE1, CE2, and CE3) all make use of an internal link L1 within core network 130 that exhibits congestion 602. Additionally, assume that routers CE1 and CE2 initiate dynamic traffic shaping as a result of congestion 602 (e.g., by decreasing their traffic rates), but that CE3 does not. For example, CE3 may not adjust its traffic rate because the device does not support dynamic traffic shaping, has been incorrectly configured, etc. In such a case, CE3 is unfairly taking advantage of the proper behavior of CE1 and CE2, by continuing to send its traffic along L1 at a higher rate.

Figure 7A:
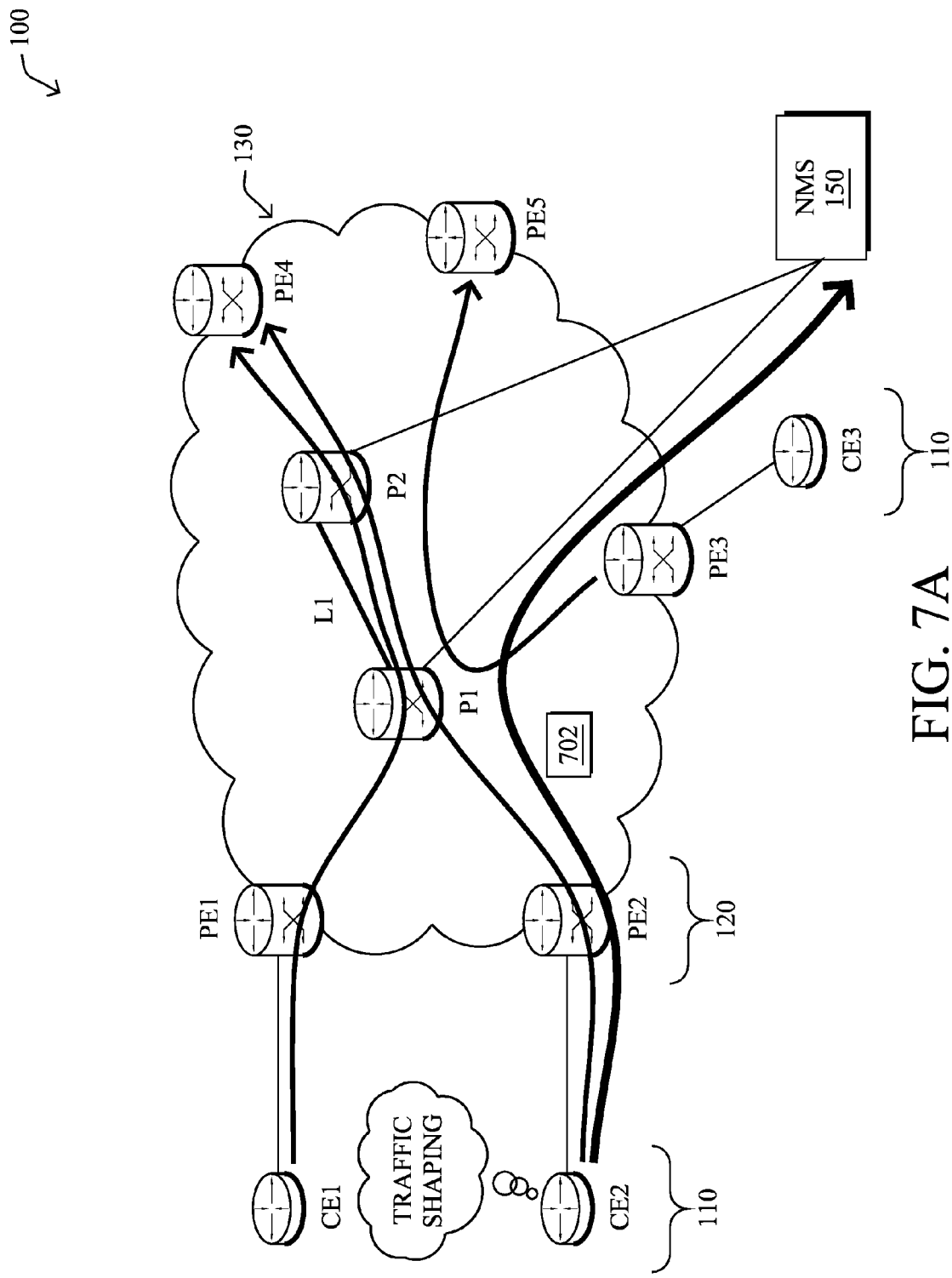
FIG. 7A-7E illustrate an example fairness mechanism for traffic shaping.

In some embodiments, a new message (e.g., a SNMPv3 message, a Netconf message, etc.) may be sent to the DSFA that reports on dynamic shaping adjustments made by the CE routers. For example, as shown in FIG. 7A and continuing the example of FIG. 6, CE2 may send a dynamic shaping adjustment (DSA) message 702 to the DSFA hosted on NMS 150. DSA message 702 may include a series of type-length-values (TLVs) that report on the dynamic traffic shaping actions taken by the CE. For example, DSA message 702 may indicate whether the router increased or decreased its traffic shaping rate r, for how long the change was made, when the router reverted the rate change (if applicable), a time stamp, or any other information that conveys to the DSFA the state of the dynamic traffic shaping process. In further cases, DSA message 702 may include the list of destinations for the traffic at the time the dynamic shaping change was triggered. In one embodiment, the full list of traffic destinations may be reported in a compressed form to the DSFA. In another embodiment, the list of the top n-number of destinations may be reported after compression (e.g., the top 5 destinations in terms of traffic volume sent from CE2). In yet another embodiment, the destination information and traffic volumes may be obtained from dynamically generated Netflow records that are exported to a centralized collector (e.g., NMS 150, etc.).

In general, the DSFA is in charge of maintaining the identities of the CE routers, as well as their time stamped actions (e.g., rate adjustments) reported via DSA messages. Further information that may be maintained by the DSFA may include information regarding how much the rate was adjusted, the frequency of traffic rate adjustments by a router, or any other information regarding the dynamic traffic shaping activities across the network.

Figure 7B:
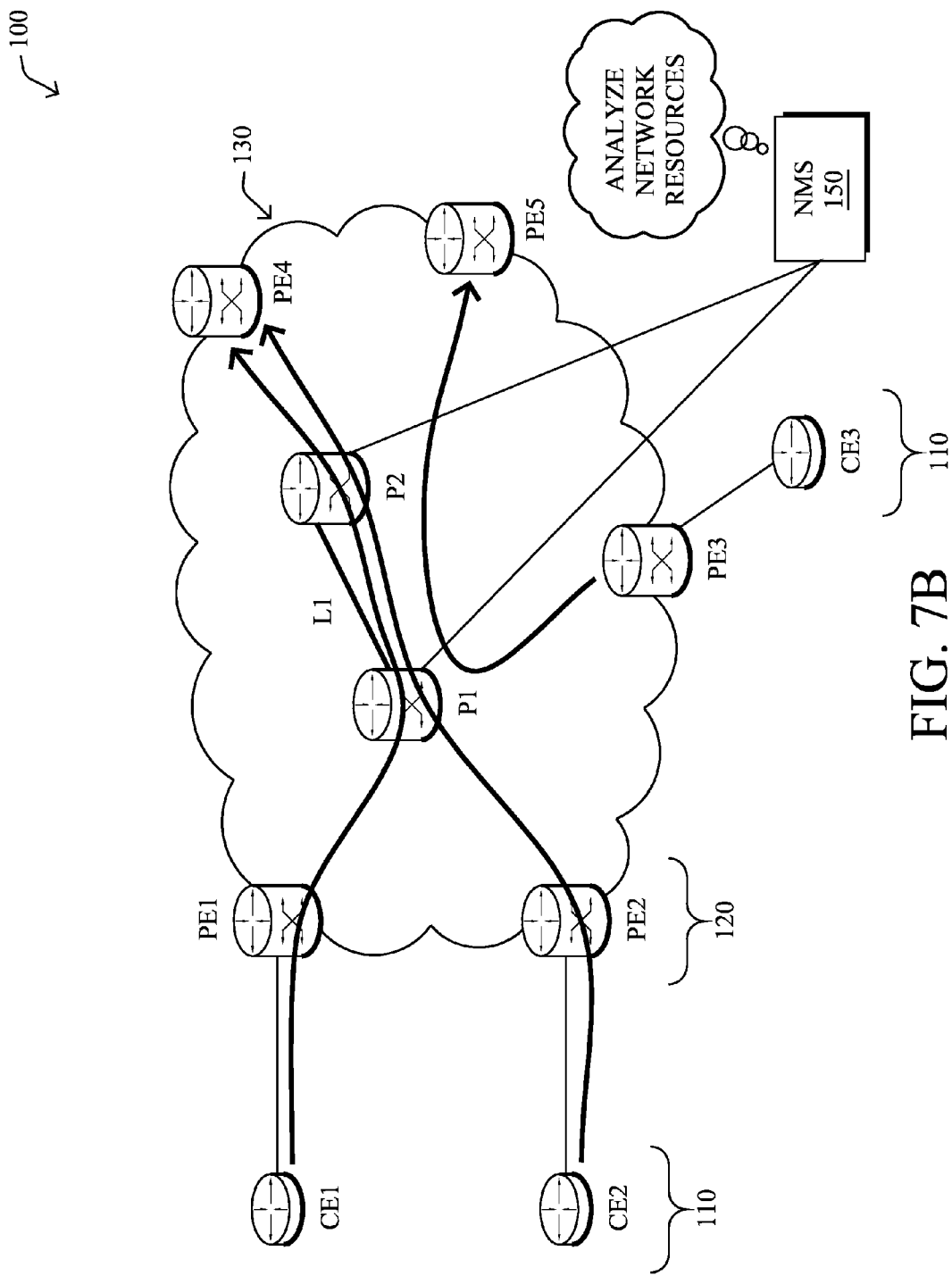

In some embodiments, the DSFA may determine which nodes contribute to a network resource saturation condition (e.g., congestion along a particular network link, etc.) and, at the same time, trigger dynamic traffic shaping by other nodes. In response to receiving one or more DSA messages, the DSFA may trigger network resource analysis. For example, as shown in FIG. 7B, the DSFA hosted by NMS 150 may analyze the network resources associated with the congestion along link L1. In one embodiment, DSA messages may be sent periodically to the DSFA, thereby giving the DSFA the most up-to-date information available. In such a case, the DSFA may perform resource analysis without having to generate any new control traffic on the network. In another embodiment, the DSFA may request a refresh of the values from the CE routers (e.g., specifically requesting new DSA messages be sent). Based on the received DSA messages, the DSFA may determine whether there is any correlation between the received DSA messages/traffic shaping events. For example, the DSFA hosted on NMS 150 may analyze the DSA messages received from the CE routers, to determine whether there are any common network resources used by the CE router(s) that triggered dynamic shaping changes (e.g., whether CE1 and CE2 use the same resources, such as link L1).

Figure 7C:
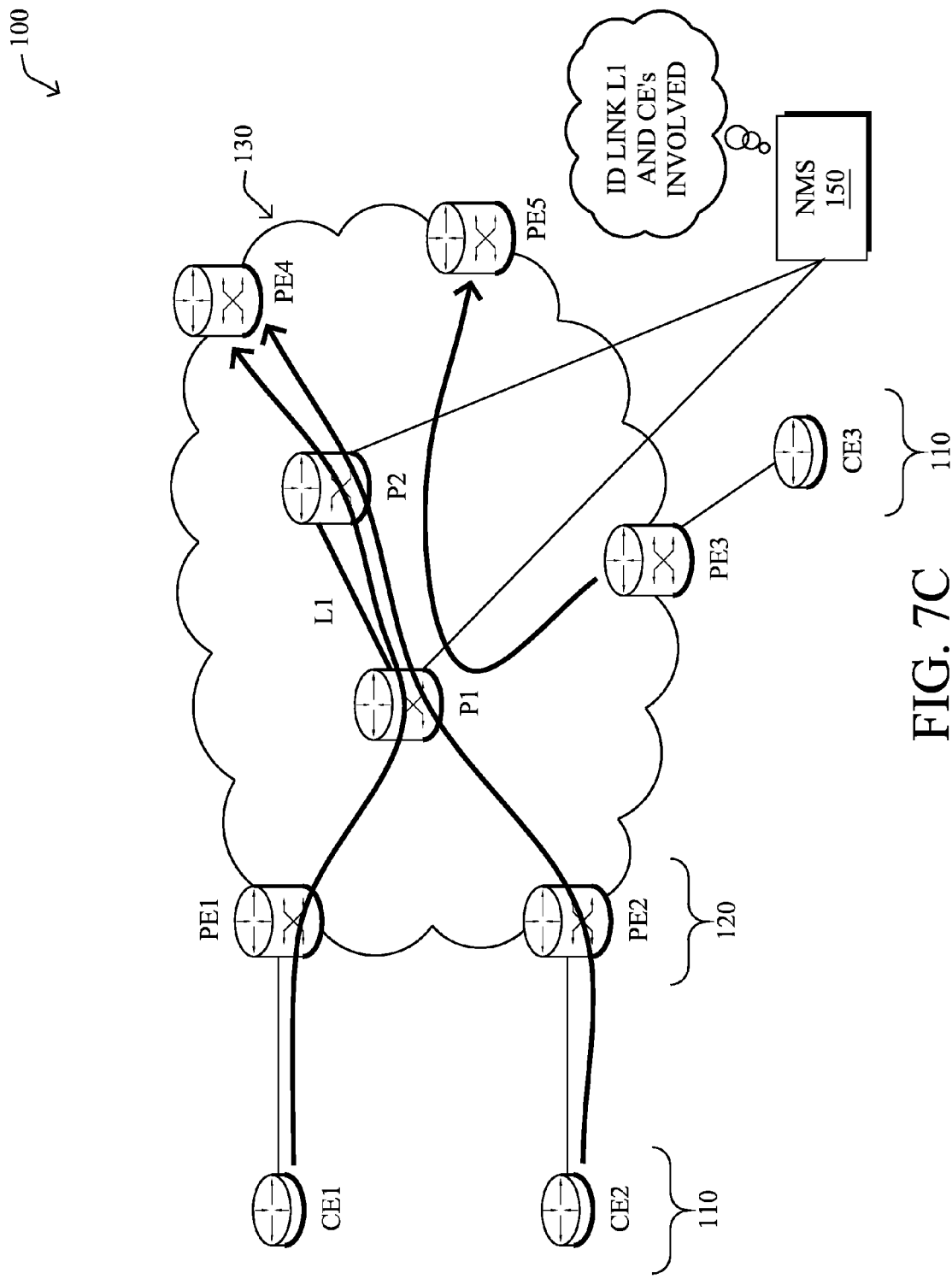

By inspecting the set of CE routers that sent DSA messages, along with the top n-number of destinations, the DSFA can compute the list of network elements used by these traffic flows. In one embodiment, the DSFA may use an inverse shortest path first (SPF) mechanism, to identify the common link(s) between the top n-number of traffic flows from the reporting CE routers that triggered shaping adjustments and their respective destinations. For example, as shown in FIG. 7C, the DSFA hosted on NMS 150 may identify common link L1 by inspecting the top n-number of paths and corresponding destinations used by the reporting routers, CE1 and CE2. In an IoT field area network, such a calculation is fairly straightforward. In an enterprise of service provider networks, the DSFA component may first have to determine the set of PE routers (e.g., sources and destinations) used by the sending CE routers and their respective destination (e.g., using MP-BGP, etc.). The DSFA may then use this information with the routing link state database to compute the set of links in common between the set of CE routers that altered their shaping rates.

Figure 7D:
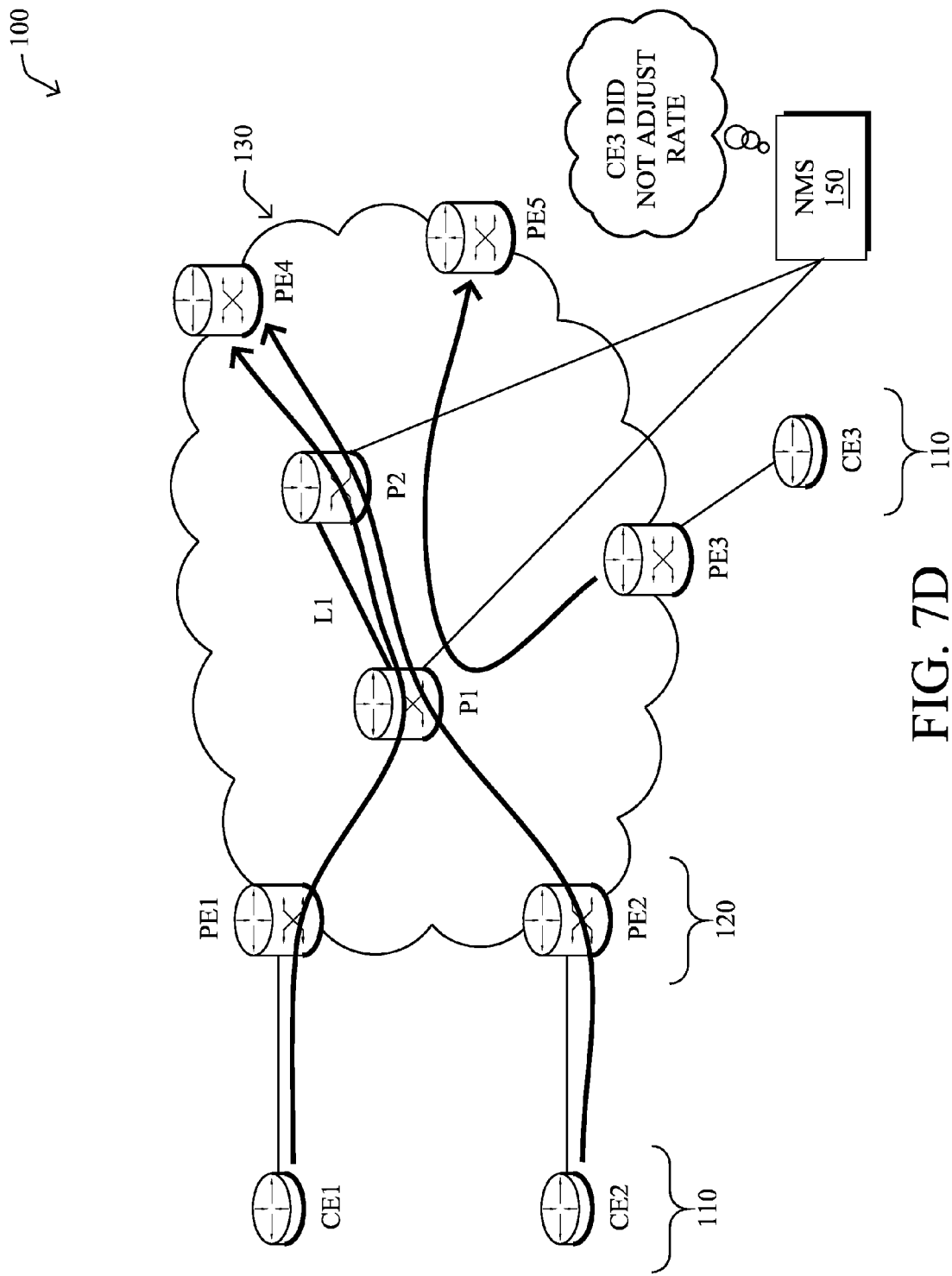

Once the DSFA has identified the resource(s) that are shared by the well-behaving CE routers (e.g., those that dynamically adjusted their traffic rates and reported on the changes), the DSFA may identify any misbehaving CE routers that also use those resources. As used herein, a misbehaving router generally refers to a router that violates a traffic shaping rules policy (e.g., a CE router that uses a shaping policy that is unfair to other routers in the network). For example, a misbehaving router may be a router that did not adjust its traffic rate, thereby causing other routers to adjust their traffic shaping rates, leading to an unfair condition. For example, as shown in FIG. 7D, the DSFA executed by NMS 150 may determine that CE3 is misbehaving because it did not adjust its traffic rate, despite there being congestion along link L1 and the other routers (e.g., CE1 and CE2) that also use link L1 dynamically decreased their respective traffic rates. To that end, the DSFA component may request that the node upstream of the saturated link L1 (e.g., router P1) send a sample of the traffic through the node to the DSFA. In an unsolicited embodiment, as soon as congestion starts to happen, the upstream router from the congested link may proactively supply this information to the DSFA.

The DSFA may analyze the received set of traffic, to determine the set of misbehaving node(s). Note that such an operation is not CPU-intensive and could be performed without heavy computation. For example, the DSFA may analyze the set of traffic received from P1, identify the full list of CE routers sending traffic through L1 (e.g., CE1-CE3), and remove the well-behaved CE routers (e.g., CE1-CE2), to identify the list of misbehaving CE routers (e.g., CE3). In another embodiment, instead of sending the traffic sample from the saturated link endpoint(s), dynamic Netflow exports can be initiated to obtain metadata about the traffic traversing the saturated link L1.

Figure 7E:
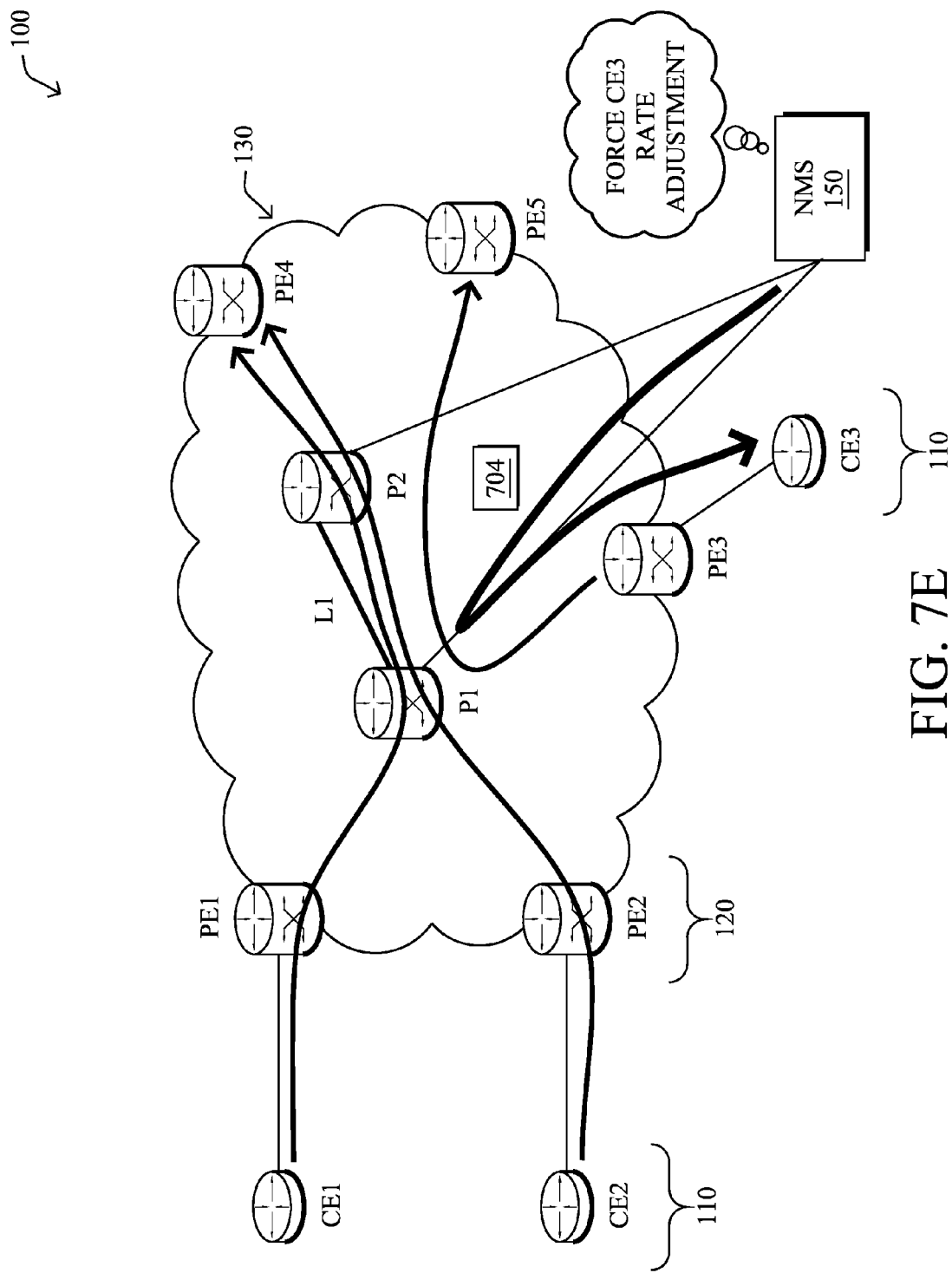

In some embodiments, the DSFA may initiate any number of corrective actions, in response to identifying a misbehaving router. In one embodiment, the DSFA may send a manual time-based traffic shaping rate instruction to the misbehaving node(s). Typically, a node may misbehave because it does not support dynamic traffic shaping or is misconfigured. For example, as shown in FIG. 7E, the DSFA executed by NMS 150 may send a new message 704 (e.g., an SNMPv3 message, a Netconf message, etc.) to the misbehaving router CE3 that specifies the shaping strategy that should be adopted by CE3. In one embodiment, the shaping strategy may be on-the-fly, in which case message 704 may request that CE3 increase or decrease its shaping rate to a value R computed by the DSFA. The new rate R may then be used by CE3 until instructed otherwise or for a period of time T specified in message 704. After expiration of the time period T, CE3 may stop using the shaping rate R. In yet another embodiment, if supported, dynamic shaping may be enabled in the next upstream router from CE3 (e.g., PE3), to prevent congestion from taking place in the core network 130.

Different strategies may be used by the DSFA to compute the rate R. In one embodiment, the DSFA may observe the time-profile sequence of received DSA messages along with the shaping rate changes reported by each well-behaving CE routers, to compute the rate R using a fair assignment mechanism. For example, if the DSFA determines that every day at 4:00 PM, CE1 and CE2 decrease their shaping rate by 30% for ten minutes, the DSFA may request CE3 to reduce R by 10%, should all CE routers send an equal amount of traffic. In this way, routers CE1-CE3 may each reduce their shaping rates by 20%, as opposed to 30%, 30%, and 0%, respectively.

In another embodiment, the DSFA may compute the rate R for the misbehaving node(s) by taking into account the amount of traffic sent by each CE router that use the resource(s), the criticality of their respective traffic (e.g., traffic criticality scores), or other such factors, to ensure weighted fairness. For example, one CE router may be responsible for sending only voice and video traffic, whereas the other CE routers send only web traffic. In this scenario, it may be possible to increase the shaping of the latter CE routers and reduce the shaping of the former CE, to reduce the impact on the voice and video traffic (e.g., the voice and video traffic may be considered more critical than the web traffic). Said differently, the DSFA may not request each misbehaving CE to adjust their shaping rates equally, in some cases.

In yet another embodiment, DSA messages may also be sent to the DFSA when traffic rates are increased. Based on these messages, the DSFA may determine whether some routers tend to increase their rates according to different strategies. For instance, a router R1 may tend to be too optimistic regarding the available network resources and increase its shaping rate too quickly in comparison to the other routers. In doing so, other routers may decrease their shaping rates, leading to an unfair situation. In one embodiment, in response to receiving the DSA messages from the routers, the DSFA may send a new message to the router R1 that specifies an optimal rate of increase bound for the router's shaping rate changes. This may prevent the router from being too aggressive and causing an unfair situation with respect to the other routers.

Figure 8:
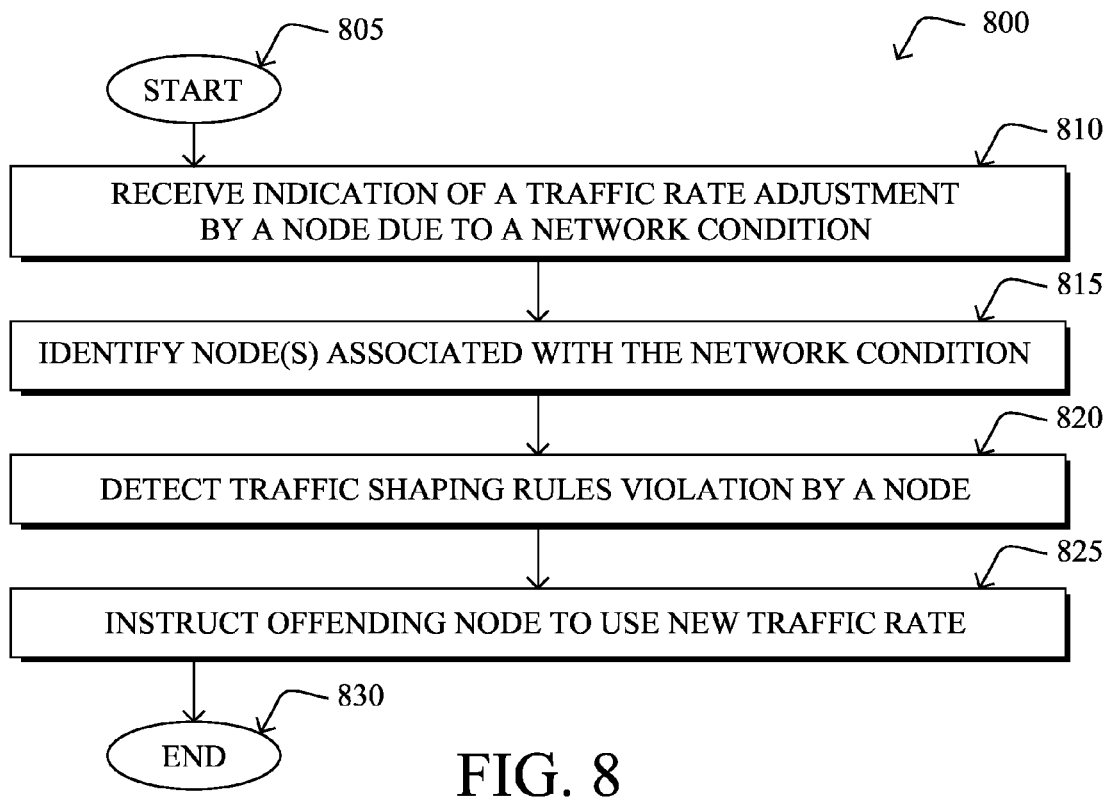
FIG. 8 illustrates an example simplified procedure for enforcing traffic shaping fairness.

FIG. 8 illustrates an example simplified procedure for enforcing traffic shaping fairness in accordance with one or more embodiments described herein. The procedure 800 may start at step 805, and continues to step 810, where, as described in greater detail above, a network device receives an indication of a traffic rate adjustment by a network node (e.g., an increase or decrease to the node's traffic shaping rate). For example, as discussed above, a DSFA hosted on a network device may receive a DSA message from a CE router that indicates that the router has adjusted its traffic shaping rate. In various embodiments, the rate adjustment may be performed proactively (e.g., based on machine learning model predictions regarding future network conditions) or reactively (e.g., based on an observed network condition).

At step 815, the device identifies the involved node(s) that contribute to the network condition, as described in greater detail above. For example, a router may dynamically decrease its traffic shaping rate due to network contention present in the core network. In one embodiment, the network device may identify the involved node(s) by correlating DSA messages received from different nodes. For example, the network device may correlate the type of changes (e.g., increases or decreases to the shaping rates), the times of the changes (e.g., based on timestamps in the DSA messages), the destinations, or other such information included in the DSA messages received from different routers. Based on this correlation, the network device may identify the resources that are shared by the reporting routers. The network device may, for example, inspect traffic information associated with the network condition, to identify all routers that potentially contribute to the conditions. In another embodiment, the network condition may correspond to one or more routers increasing their traffic shaping rates, leading to other routers dynamically decreasing their shaping rates.

At step 820, the device may detect a traffic shaping rules violation, as detailed above. In one embodiment, a traffic shaping rules violation may correspond to a router not adjusting its traffic shaping rate, while one or more other nodes that share network resources (e.g., links, etc.) with the router adjust their shaping rates. For example, an offending node may be identified by identifying a router that did not adjust its traffic shaping rate by identifying the routers that send traffic through a network link experiencing contention and removing from consideration those routers that reported dynamic shaping rate adjustments. In doing so, any routers that failed to report a shaping rate decrease may be identified as offending nodes. In another embodiment, a traffic shaping rules violation may correspond to a router dynamically increasing its traffic shaping rate and negatively impacting the shaping rates of other routers that use the same network resources (e.g., the other routers decrease their shaping rates while the violating router increases its rate).

At step 825, the device may send an instruction that causes the offending node(s) to use a new traffic shaping rate, as described in greater detail above. In various embodiments, the new traffic shaping rate may be calculated by a fairness mechanism that takes into account the shaping rates used by the other routers that share network resources with the offending node(s). For example, the shaping rates may be distributed evenly among all of the routers. In other cases, a weighted fairness mechanism may be used that also takes into account the criticality of the traffic associated with the different routers. For example, a router that sends more critical traffic may be allowed to maintain a higher traffic rate than another router that sends less critical traffic. In one embodiment, the instruction may be sent directly to the offending node. In another embodiment, the instruction may be sent to a PE router instead of a violating CE router, To cause the traffic from the CE router to be restricted. Procedure 800 then ends at step 830.

Figure 9:
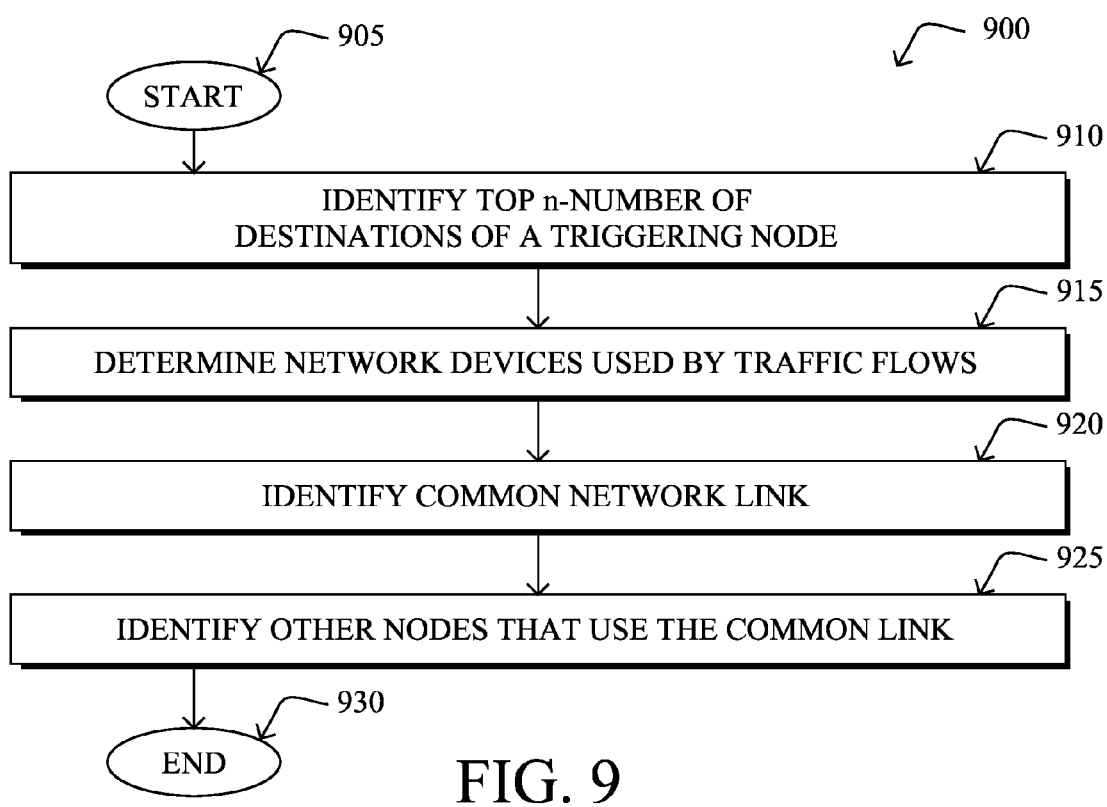
FIG. 9 illustrates an example simplified procedure for identifying network nodes that use a common network link.

FIG. 9 illustrates an example simplified procedure for identifying network nodes that use a common network link in accordance with one or more embodiments described herein. The procedure 900 may start at step 905, and continues to step 910, where, as described in greater detail above, a network device may identify the top n-number of destinations used by a triggering node. As discussed above, for example, a DSA messages sent to a DSFA from a router may indicate that the router has triggered a traffic shaping rate adjustment and also identify the top n-number of destinations of the route.

At step 915, the device may determine the network devices used by the traffic flows between the triggering router and the n-number of destinations, as detailed above. In other words, the paths used by the triggering router through the core network to reach the destinations may be identified based on information received from the network devices within the core network. Such information may be provided on a push or pull basis (e.g., the DSFA may query the devices for their routing information or may receive it in an unsolicited manner).

At step 920, the device may identify a common network link from among the source-destination paths, as described in greater detail above. For example, assume that the triggering router uses paths P1, P2, and P3 to reach its top three destinations and that a link L3 is shared by all three paths within the core network. In such a case, the DSFA may identify the link L3 as a common link that may have caused the triggering router to adjust its traffic shaping rate (e.g., due to contention along link L3).

At step 925, as detailed above, the device may identify other nodes that also use the common link. For example, as discussed above, information regarding traffic that flows across the common link may be analyzed to identify the routers that send traffic along the link. Notably, identification of these routers may then be used as part of a fairness process, to ensure that the other routers also dynamically adjusted their traffic shaping rates in a fair way. Procedure 900 then ends at step 930.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, allow for traffic shaping rates to be adjusted dynamically and in a way that is fair to the routers involved. This allows for the mixing of routers that use different shaping strategies (e.g., during a migration phase, as part of a multi-vendor environment, due to software or hardware differences that have varying capabilities, etc.), while still avoiding unfair traffic shaping adjustments.

While there have been shown and described illustrative embodiments that provide for predictive network control to be used in multicarrier WANs, it is to be understood that various other adaptations and modifications may be made within the spirit and scope of the embodiments herein. For example, the predictive networking techniques described herein may be adapted for use in other forms of networks, such as the IoT. In addition, the embodiments have been shown and described herein with relation to specific protocols and naming conventions for purposes of illustration. However, the embodiments in their broader sense are not as limited, and may, in fact, be used with other types of suitable protocols and/or naming conventions.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, an indication of a traffic shaping rate adjustment by a node in the network due to a network condition;
   identifying, by the device, a set of network nodes that are associated with the network condition;
   detecting, by the device, a traffic shaping rules violation by an offending node in the set of network nodes, wherein the traffic shaping rules control a rate at which packets are communicated over a network connection with a provider-edge router; and
   in response to detecting the traffic shaping rules violation by the offending node, sending, by the device, an instruction that causes the offending node to use a different traffic shaping rate.

2. The method as in claim 1, wherein the rules violation corresponds to the offending node not adjusting its traffic shaping rate.

3. The method as in claim 1, wherein the rules violation corresponds to the offending node increasing its traffic shaping rate while a traffic shaping rate of another node in the set is decreased.

4. The method as in claim 1, wherein the traffic shaping adjustment was made proactively by the node, and wherein the network condition is a predicted future network condition.

5. The method as in claim 1, wherein the set of network nodes that are associated with the network condition are identified by:
   identifying a plurality of destinations used by the node;
   determining a set of network devices used by traffic flows from the node to the destinations;
   identifying a common network link between the set of network devices; and
   identifying the set of network nodes as having used the common network link.

6. The method as in claim 1, wherein the instruction is sent to the provider-edge router that is upstream from the offending node and regulates the shaping rate for the incoming traffic originated by the offending node.

7. The method as in claim 1, wherein the network condition corresponds to contention for a network resource shared by the set of network nodes.

8. The method as in claim 1, wherein the different traffic shaping rate is associated with a time period, and wherein the instruction causes the offending node to use the different traffic shaping rate during the time period.

9. The method as in claim 1, further comprising:
   storing, by the device, indications of traffic rate adjustments by the set of nodes.

10. The method as in claim 1, wherein the rules violation corresponds to the offending node decreasing its traffic shaping rate by a percentage that is less than that of another node in the set.

11. The method as in claim 1, further comprising:
    querying, by the device, the set of nodes for traffic rate adjustments performed by the nodes.

12. The method as in claim 1, wherein traffic flowing through each node in the set has an associated criticality score, and wherein the different traffic shaping rate is based on the criticality scores.

13. An apparatus, comprising:
one or more network interfaces to communicate with a network;
a processor coupled to the network interfaces and configured to execute one or more processors; and
a memory configured to store a process executable by the processor, the process when executed operable to:
receive an indication of a traffic shaping rate adjustment by a node due to a network condition;
identify a set of network nodes that are associated with the network condition;
detect a traffic shaping rules violation by an offending node in the set of network nodes, wherein the traffic shaping rules control a rate at which packets are communicated over a network connection with a provider-edge router; and
in response to detecting the traffic shaping rules violation by the offending node, send an instruction that causes the offending node to use a different traffic shaping rate.

14. The apparatus as in claim 13, wherein the rules violation corresponds to the offending node not adjusting its traffic shaping rate.

15. The apparatus as in claim 13, wherein the rules violation corresponds to the offending node increasing its traffic shaping rate while a traffic shaping rate of another node in the set is decreased.

16. The apparatus as in claim 13, wherein the traffic shaping adjustment was made proactively by the node, and wherein the network condition is a predicted future network condition.

17. The apparatus as in claim 13, wherein the set of network nodes that contribute to the network contention is identified by:
identifying a plurality of destinations used by the node;
determining a set of network devices used by traffic flows from the node to the destinations;
identifying a common network link between the set of network devices; and
identifying the set of network nodes as having used the common network link.

18. The apparatus as in claim 13, wherein the instruction is sent to the provider-edge router that is upstream from the offending node and regulates the shaping rate for the incoming traffic originated by the offending node.

19. The apparatus as in claim 13, wherein the network condition corresponds to contention for a network resource shared by the set of network nodes.

20. The apparatus as in claim 13, wherein the different traffic shaping rate is associated with a time period, and wherein the instruction causes the offending node to use the different traffic shaping rate during the time period.

21. The apparatus as in claim 13, wherein the process when executed is further operable to:
store indications of traffic rate adjustments by the set of nodes.

22. The apparatus as in claim 13, wherein the process when executed is further operable to:
query the set of nodes for traffic rate adjustments performed by the nodes.

23. The apparatus as in claim 13, wherein traffic flowing through each node in the set has an associated criticality score, and wherein the different traffic shaping rate is based on the criticality scores.

24. The apparatus as in claim 13, wherein the rules violation corresponds to the offending node decreasing its traffic shaping rate by a percentage that is less than that of another node in the set.

25. A tangible, non-transitory, computer-readable media having software encoded thereon, the software when executed by a processor operable to:
receive an indication of a traffic shaping rate adjustment by a node due to a network condition;
identify a set of network nodes that are associated with the network condition;
detect a traffic shaping rules violation by an offending node in the set of network nodes, wherein the traffic shaping rules control a rate at which packets are communicated over a network connection with a provider-edge router; and
in response to detecting the traffic shaping rules violation by the offending node, send an instruction that causes the offending node to use a different traffic shaping rate.

* * * * *